United States Patent [19]
Takai

[11] Patent Number: 5,394,438
[45] Date of Patent: * Feb. 28, 1995

[54] DATA TRANSMITTING METHOD

[75] Inventor: Mamoru Takai, Osaka, Japan

[73] Assignee: Megasoft, Inc., Suita, Japan

[ * ] Notice: The portion of the term of this patent subsequent to Oct. 8, 2008 has been disclaimed.

[21] Appl. No.: 774,499

[22] Filed: Oct. 10, 1991

[30] Foreign Application Priority Data

May 27, 1991 [JP] Japan .................................. 3-120932

[51] Int. Cl.⁶ ........................ H04L 25/34; H04L 25/49
[52] U.S. Cl. .................................... 375/286; 375/240; 341/63
[58] Field of Search ..................... 375/17, 38, 58, 121, 375/122; 358/261.1; 341/63; 455/59

[56] References Cited

U.S. PATENT DOCUMENTS

| | | | |
|---|---|---|---|
| 4,121,259 | 10/1978 | Preuss et al. ..................... | 358/261.1 |
| 4,360,840 | 11/1982 | Wolfrum et al. ................. | 341/63 X |
| 4,420,771 | 12/1983 | Pirsch ................................ | 341/63 X |
| 4,622,685 | 11/1986 | Dhawan et al. ................... | 375/8 X |
| 4,626,829 | 12/1986 | Hauck .......................... | 358/261.1 X |
| 4,791,653 | 12/1988 | McFarland et al. ............ | 370/107 X |
| 4,884,287 | 11/1989 | Jones et al. .......................... | 375/121 |
| 5,056,113 | 10/1991 | Takai .............................. | 375/121 X |
| 5,224,124 | 6/1993 | Hamano et al. ................. | 375/121 X |

FOREIGN PATENT DOCUMENTS 2-262747 10/1990 Japan .

Primary Examiner—Stephen Chin
Assistant Examiner—Bryan E. Webster
Attorney, Agent, or Firm—Lowe, Price, LeBlanc & Becker

[57] ABSTRACT

Data communication system between computers; communication paths composed of m transmission lines are formed between two computers, and data to be transferred are coded based on a coding table comprised of encoding codes. When transmitting, state of the m transmission lines 74, 76 and 78 is changed. Therefore, timing signal is not required.

12 Claims, 12 Drawing Sheets

FIG. 3 (prior art)

| \multicolumn{6}{c}{Encoding table} | | | | | |
|---|---|---|---|---|---|
| Original data | Encoding code | Original data | Encoding code | Original data | Encoding code |
| 0 | 120 | 44 | 121210 | 88 | 132310 |
| 1 | 1010 | 45 | 121212 | 89 | 132312 |
| 2 | 1210 | 46 | 121230 | 90 | 131210 |
| 3 | 1310 | 47 | 121232 | 91 | 131212 |
| 4 | 10120 | 48 | 121302 | 92 | 131230 |
| 5 | 10320 | 49 | 121320 | 93 | 131232 |
| 6 | 12120 | 50 | 121310 | 94 | 131302 |
| 7 | 12320 | 51 | 121312 | 95 | 131320 |
| 8 | 13020 | 52 | 123020 | 96 | 131310 |
| 9 | 13120 | 53 | 123010 | 97 | 131312 |
| 10 | 102020 | 54 | 123012 | 98 | 1020210 |
| 11 | 102010 | 55 | 123030 | 99 | 1020212 |
| 12 | 102012 | 56 | 123032 | 100 | 1020230 |
| 13 | 102030 | 57 | 123210 | 101 | 1020232 |
| 14 | 102032 | 58 | 123212 | 102 | 1020130 |
| 15 | 102102 | 59 | 123230 | 103 | 1020132 |
| 16 | 102120 | 60 | 123232 | 104 | 1020310 |
| 17 | 102130 | 61 | 123102 | 105 | 1020312 |
| 18 | 102132 | 62 | 123120 | 106 | 1021010 |
| 19 | 102302 | 63 | 123130 | 107 | 1021012 |
| 20 | 102320 | 64 | 123132 | 108 | 1021030 |
| 21 | 102310 | 65 | 130210 | 109 | 1021032 |
| 22 | 102312 | 66 | 130212 | 110 | 1021210 |
| 23 | 101210 | 67 | 130230 | 111 | 1021212 |
| 24 | 101212 | 68 | 130232 | 112 | 1021230 |
| 25 | 101230 | 69 | 130102 | 113 | 1021232 |
| 26 | 101232 | 70 | 130120 | 114 | 1021310 |
| 27 | 101302 | 71 | 130130 | 115 | 1021312 |
| 28 | 101320 | 72 | 130132 | 116 | 1023010 |
| 29 | 101310 | 73 | 130302 | 117 | 1023012 |
| 30 | 101312 | 74 | 130320 | 118 | 1023030 |
| 31 | 103020 | 75 | 130310 | 119 | 1023032 |
| 32 | 103010 | 76 | 130312 | 120 | 1023210 |
| 33 | 103012 | 77 | 132020 | 121 | 1023212 |
| 34 | 103030 | 78 | 132010 | 122 | 1023230 |
| 35 | 103032 | 79 | 132012 | 123 | 1023232 |
| 36 | 103210 | 80 | 132030 | 124 | 1023130 |
| 37 | 103212 | 81 | 132032 | 125 | 1023132 |
| 38 | 103230 | 82 | 132102 | 126 | 1012130 |
| 39 | 103232 | 83 | 132120 | 127 | 1012132 |
| 40 | 103102 | 84 | 132130 | 128 | 1012310 |
| 41 | 103120 | 85 | 132132 | 129 | 1012312 |
| 42 | 103130 | 86 | 132302 | 130 | 1013010 |
| 43 | 103132 | 87 | 132320 | 131 | 1013012 |

FIG. 4 (prior art)

| Encoding table |||||| 
|---|---|---|---|---|---|
| Original data | Encoding code | Original data | Encoding code | Original data | Encoding code |
| 132 | 1013030 | 176 | 1230210 | 220 | 1303130 |
| 133 | 1013032 | 177 | 1230212 | 221 | 1303132 |
| 134 | 1013210 | 178 | 1230230 | 222 | 1320210 |
| 135 | 1013212 | 179 | 1230232 | 223 | 1320212 |
| 136 | 1013230 | 180 | 1230130 | 224 | 1320230 |
| 137 | 1013232 | 181 | 1230132 | 225 | 1320232 |
| 138 | 1013130 | 182 | 1230310 | 226 | 1320130 |
| 139 | 1013132 | 183 | 1230312 | 227 | 1320132 |
| 140 | 1030210 | 184 | 1232130 | 228 | 1320310 |
| 141 | 1030212 | 185 | 1232132 | 229 | 1320312 |
| 142 | 1030230 | 186 | 1232310 | 230 | 1321010 |
| 143 | 1030232 | 187 | 1232312 | 231 | 1321012 |
| 144 | 1030130 | 188 | 1231010 | 232 | 1321030 |
| 145 | 1030132 | 189 | 1231012 | 233 | 1321032 |
| 146 | 1030310 | 190 | 1231030 | 234 | 1321210 |
| 147 | 1030312 | 191 | 1231032 | 235 | 1321212 |
| 148 | 1032130 | 192 | 1231210 | 236 | 1321230 |
| 149 | 1032132 | 193 | 1231212 | 237 | 1321232 |
| 150 | 1032310 | 194 | 1231230 | 238 | 1321310 |
| 151 | 1032312 | 195 | 1231232 | 239 | 1321312 |
| 152 | 1031010 | 196 | 1231310 | 240 | 1323010 |
| 153 | 1031012 | 197 | 1231312 | 241 | 1323012 |
| 154 | 1031030 | 198 | 1302130 | 242 | 1323030 |
| 155 | 1031032 | 199 | 1302132 | 243 | 1323032 |
| 156 | 1031210 | 200 | 1302310 | 244 | 1323210 |
| 157 | 1031212 | 201 | 1302312 | 245 | 1323212 |
| 158 | 1031230 | 202 | 1301010 | 246 | 1323230 |
| 159 | 1031232 | 203 | 1301012 | 247 | 1323232 |
| 160 | 1031310 | 204 | 1301030 | 248 | 1323130 |
| 161 | 1031312 | 205 | 1301032 | 249 | 1323132 |
| 162 | 1212130 | 206 | 1301210 | 250 | 1312130 |
| 163 | 1212132 | 207 | 1301212 | 251 | 1312132 |
| 164 | 1212310 | 208 | 1301230 | 252 | 1312310 |
| 165 | 1212312 | 209 | 1301232 | 253 | 1312312 |
| 166 | 1213010 | 210 | 1301310 | 254 | 1313010 |
| 167 | 1213012 | 211 | 1301312 | 255 | 1313012 |
| 168 | 1213030 | 212 | 1303010 | | |
| 169 | 1213032 | 213 | 1303012 | | |
| 170 | 1213210 | 214 | 1303030 | | |
| 171 | 1213212 | 215 | 1303032 | | |
| 172 | 1213230 | 216 | 1303210 | | |
| 173 | 1213232 | 217 | 1303212 | | |
| 174 | 1213130 | 218 | 1303230 | | |
| 175 | 1213132 | 219 | 1303232 | | |

F I G. 9

| Original data | Encoding code | Original data | Encoding code | Original data | Encoding code | Original data | Encoding code | Original data | Encoding code | Original data | Encoding code |
|---|---|---|---|---|---|---|---|---|---|---|---|
| 0 | 1 | 48 | 363 | 96 | 462 | 144 | 556 | 192 | 655 | 240 | 754 |
| 1 | 271 | 49 | 364 | 97 | 463 | 145 | 557 | 193 | 656 | 241 | 755 |
| 2 | 272 | 50 | 365 | 98 | 464 | 146 | 561 | 194 | 657 | 242 | 756 |
| 3 | 273 | 51 | 366 | 99 | 465 | 147 | 562 | 195 | 661 | 243 | 757 |
| 4 | 274 | 52 | 367 | 100 | 466 | 148 | 563 | 196 | 662 | 244 | 761 |
| 5 | 275 | 53 | 371 | 101 | 467 | 149 | 564 | 197 | 663 | 245 | 762 |
| 6 | 276 | 54 | 372 | 102 | 471 | 150 | 565 | 198 | 664 | 246 | 763 |
| 7 | 277 | 55 | 373 | 103 | 472 | 151 | 566 | 199 | 665 | 247 | 764 |
| 8 | 311 | 56 | 374 | 104 | 473 | 152 | 567 | 200 | 666 | 248 | 765 |
| 9 | 312 | 57 | 375 | 105 | 474 | 153 | 571 | 201 | 667 | 249 | 766 |
| 10 | 21 | 58 | 376 | 106 | 475 | 154 | 572 | 202 | 671 | 250 | 767 |
| 11 | 313 | 59 | 377 | 107 | 476 | 155 | 573 | 203 | 672 | 251 | 771 |
| 12 | 314 | 60 | 411 | 108 | 477 | 156 | 574 | 204 | 673 | 252 | 772 |
| 13 | 22 | 61 | 412 | 109 | 511 | 157 | 575 | 205 | 674 | 253 | 773 |
| 14 | 315 | 62 | 413 | 110 | 512 | 158 | 576 | 206 | 675 | 254 | 774 |
| 15 | 316 | 63 | 414 | 111 | 513 | 159 | 577 | 207 | 676 | 255 | 26 |
| 16 | 317 | 64 | 415 | 112 | 514 | 160 | 611 | 208 | 677 | | |
| 17 | 321 | 65 | 416 | 113 | 515 | 161 | 612 | 209 | 711 | | |
| 18 | 322 | 66 | 417 | 114 | 516 | 162 | 613 | 210 | 712 | | |
| 19 | 323 | 67 | 421 | 115 | 517 | 163 | 614 | 211 | 713 | | |
| 20 | 324 | 68 | 422 | 116 | 521 | 164 | 615 | 212 | 714 | | |
| 21 | 325 | 69 | 423 | 117 | 522 | 165 | 616 | 213 | 715 | | |
| 22 | 326 | 70 | 424 | 118 | 523 | 166 | 617 | 214 | 716 | | |
| 23 | 327 | 71 | 425 | 119 | 524 | 167 | 621 | 215 | 717 | | |
| 24 | 331 | 72 | 426 | 120 | 525 | 168 | 622 | 216 | 721 | | |
| 25 | 332 | 73 | 427 | 121 | 526 | 169 | 623 | 217 | 722 | | |
| 26 | 333 | 74 | 431 | 122 | 527 | 170 | 624 | 218 | 723 | | |
| 27 | 334 | 75 | 432 | 123 | 531 | 171 | 625 | 219 | 724 | | |
| 28 | 335 | 76 | 433 | 124 | 532 | 172 | 626 | 220 | 725 | | |
| 29 | 336 | 77 | 434 | 125 | 533 | 173 | 627 | 221 | 726 | | |
| 30 | 337 | 78 | 435 | 126 | 534 | 174 | 631 | 222 | 727 | | |
| 31 | 341 | 79 | 436 | 127 | 535 | 175 | 632 | 223 | 731 | | |
| 32 | 23 | 80 | 437 | 128 | 536 | 176 | 633 | 224 | 732 | | |
| 33 | 342 | 81 | 441 | 129 | 537 | 177 | 634 | 225 | 733 | | |
| 34 | 343 | 82 | 442 | 130 | 24 | 178 | 635 | 226 | 734 | | |
| 35 | 344 | 83 | 443 | 131 | 541 | 179 | 636 | 227 | 735 | | |
| 36 | 345 | 84 | 444 | 132 | 542 | 180 | 637 | 228 | 736 | | |
| 37 | 346 | 85 | 445 | 133 | 543 | 181 | 641 | 229 | 737 | | |
| 38 | 347 | 86 | 446 | 134 | 544 | 182 | 642 | 230 | 741 | | |
| 39 | 351 | 87 | 447 | 135 | 545 | 183 | 643 | 231 | 742 | | |
| 40 | 352 | 88 | 451 | 136 | 546 | 184 | 644 | 232 | 743 | | |
| 41 | 353 | 89 | 452 | 137 | 547 | 185 | 645 | 233 | 744 | | |
| 42 | 354 | 90 | 453 | 138 | 551 | 186 | 646 | 234 | 745 | | |
| 43 | 355 | 91 | 454 | 139 | 25 | 187 | 647 | 235 | 746 | | |
| 44 | 356 | 92 | 455 | 140 | 552 | 188 | 651 | 236 | 747 | | |
| 45 | 357 | 93 | 456 | 141 | 553 | 189 | 652 | 237 | 751 | | |
| 46 | 361 | 94 | 457 | 142 | 554 | 190 | 653 | 238 | 752 | | |
| 47 | 362 | 95 | 461 | 143 | 555 | 191 | 654 | 239 | 753 | | |

FIG. 11

|  | (RTS)<br>74 | (DTR)<br>76 | (TXD)<br>78 |
|---|---|---|---|
| Present state of communication paths | 1 | 0 | 1 |
| Numerical value desired to be sent out | 0<br>(as it is) | 1<br>(change) | 0<br>(as it is) |
| Changed state of communication paths | 1 | 1 | 1 |
| Numerical value desired to be sent out | 1<br>(change) | 1<br>(change) | 0<br>(as it is) |
| Changed state of communication paths | 0 | 0 | 1 |

F I G. 1 2
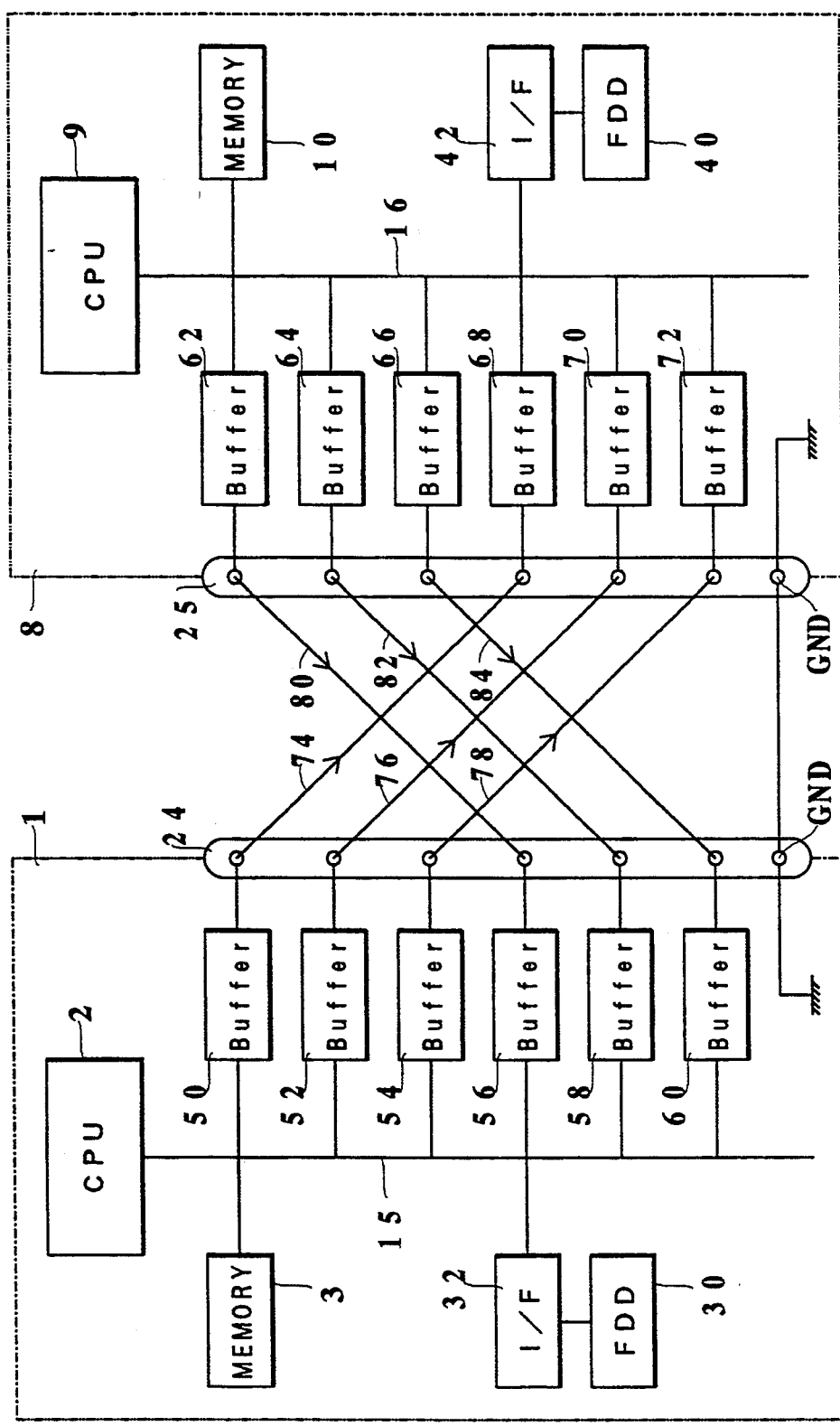

DATA TRANSMITTING METHOD

BACKGROUND OF THE INVENTION

1. Field of the Invention

The present invention relates to data transmission, and more particularly to high speed operation thereof.

2. Description of the Prior Art

In order to exchange data, data is transmitted by installing transmission lines between computers. As one of such transmission methods, hitherto is known the start-stop synchronous communication method, which is shown in FIG. 1. The communication line is delivering an H level output in the absence of data. When transmitting data of 1 character (8 bits), the transmission side first sends a start bits (L level). The reception side, receiving it, generates a sampling pulse in an interval of a specific period T (1/baud rate) from after the half period (T/2) of the specific period T. On the other hand, the transmission side, successively to the start bit S, sends out data D0 to D7 and parity bit P sequentially by 1 bit each, in an interval of the specific period T. The reception side, by the sampling pulse, takes in the data and parity bit P on the communication line. In this way, when transmission of 8-bit data is over, the transmission side delivers an H level output as a stop bit E. The reception side, when correctly receiving the stop bit E, judges that the communication has been completed without error.

Data of 1 character (8 bits) is thus transmitted. The subsequent data will be similarly operated.

In such start-stop synchronous communication method, meanwhile, the transmission rate is determined by the period T of the sampling pulse. Therefore, by shortening the period T of the sampling pulse, the transmission rate is accelerated. However, when the period T is too short, errors are likely to occur, and the reliability may be lowered. That is, the transmission rate was limited by the period T of the sampling pulse.

Furthermore, in this communication method, the start bit S and stop bit E must be added to the front and rear ends. It further causes to slow down the transmission rate.

To solve these problems, the present inventor had already proposed new communication methods (U.S. patent application Ser. No. 410,206, Japanese Laid-open Patent Application HEI 2-262747). A hardware connection diagram of the communication method disclosed in the Japanese Laid-open Patent Application No. 2-262747 is shown in FIG. 2. A terminal 24 for RS-232C of a personal computer 1 and a terminal 25 for RS-232C of a personal computer 8 are connected with cable as shown in the diagram. A terminal RTS and a terminal DTR are originally terminals for use in modem interface, but they are used as output terminals in this example. Likewise, terminals CTS, DCD are used as input terminals instead of the intended use as terminals for modem interface.

It is supposed in the following explanation that data is transmitted from the computer 1 side to the computer 8 side. A floppy disk (not shown) storing the data to be transmitted is inserted into a disk drive 30. A receiving floppy disk (not shown) is inserted into a disk drive 40. The sending side CPU 2 reads out the data of the floppy disk through an interface 32. Here, meanwhile, it is supposed to send data in the unit of 8 bits (1 character).

In the memory 3, an encoding table as shown in FIGS. 3, 4 is stored. This table is intended to obtain an encoding code corresponding to each one of the values (there are 28) of 8-bit data (original data). For example, supposing the original data to be (00000000)2 (that is, 0 in decimal notation), the corresponding encoding code is 120. When the original data is (00010011)2 (19 in decimal notation), the encoding code is 102302. The encoding table is prepared according to rules, i.e., (1) the numeral of each figure should be any one of 0, 1, 2, 3, (2) adjacent figures have different numerals, (3) the numerical value always starts with 1 and ends with 0 or 2, and (4) the values from the first figure to the P-th figure in a P-figure encoding code do not coincide with the values from the first figure to the P-th figure of a Q-figure encoding code longer than P figures. The CPU 2 converts the original data to be transmitted into an encoding code according to this encoding table. For example, when the original data is (00000000)2, 120 is obtained.

A data transmission state is shown in FIG. 5. The CPU 2 sends out thus obtained encoding code 120 by 1 figure each in the sequence of 1, 2, 0. That is, using the terminals RTS, DTR (communication path 19), 0 is sent to the reception side as terminal RTS=L, terminal DTR=L, 1 as terminal RTS=L, terminal DTR=H, 2 as terminal RTS=H, terminal DTR=L, and 3 as terminal RTS=H, terminal DTR=H.

In the first place, the receiving side CPU 9 delivers 3 (terminal RTS=H, terminal DTR=H) toward the transmission side from the communication path 22 in order to tell that it is ready to receive. Receiving it, the sending side CPU 2 sends out 1 (terminal RTS=L, terminal DTR=H) from the communication path 19.

When 1 is sent in, the receiving side CPU 9 takes it in through the terminal CTS and terminal DCD (communication path 19). In the receiving side memory 10, too, the same encoding table as shown in FIGS. 3, 4 is stored. The CPU 9 checks when the received data 1 is present or not in the encoding table. Since there is no encoding code of 1, it waits for the next figure.

Meanwhile, the receiving side CPU 9, upon receiving the data 1, changes the value of the terminal RTS, terminal DTR (communication path 22) to 0. Detecting this change, the sending side CPU 8 recognizes that the reception side is ready to receive the next figure, and sends out the next figure 2 of the encoding code to the communication path 19. The receiving side CPU 9 detects the change of the state of the communication path 19, and recognizes that the data of the next figure has been sent (see rule (2) above). In other words, it is not necessary to use the sampling pulse as shown in FIG. 1. Receiving it, the receiving side CPU 9 checks when the encoding code of 12 is present or not. Since there is no encoding code of 12, it waits for next figure.

The receiving side CPU 9, upon receiving the data 2, changes the state of the communication path 22 from 0 to 2. The sending side CPU 8, monitoring this change, recognizes that the reception side is ready to receive next figure, and sends out the next figure 0 of the encoding code to the communication path 19. Receiving it, the receiving side CPU 9 checks when the encoding code of 120 is present or not. The encoding code 120 corresponds to (00000000)2. In the encoding code of 4 figures or more, nothing begins with 120 (see rule (4) above). Therefore, the receiving side CPU 9 obtains the original data (00000000)2 at this point.

The subsequent data is similarly transmitted. At this time, the value of the first figure and the value of the last figure of the encoding code are always different (see rule (3) above), the reception side recognizes that the first figure of the next data is sent in.

When exchanging the transmission side and reception side, it is arranged so that the newly receiving side sends the reception waiting value 3. As a result, the transmission side and reception side may be exchanged easily. The encoding code always begins with 1, and ends with 0 or 2 (see rule (3) above), so that there is no risk of confusion with the reception waiting value 3.

In this method of transmission, sampling pulse is not necessary. Therefore, the speed of transmitting the encoding code does not depend on the period of the sampling pulse, but it depends on the processing speed of the CPU. Since the processing speed of the CPU 2, 9 is very fast, high speed transmission is realized.

Furthermore, since the start bit and end bit are not necessary, higher speed is also possible from this aspect. In addition, the length of the encoding code ranges from the shortest of 3 figures to the longest of 7 figures. Therefore, as compared with the serial transmission system of 8-bit data, it is possible to increase the speed furthermore.

Thus, in the transmission method shown in FIG. 2 through FIG. 5, high speed transmission is realized by making use of the high speed processing of the CPU. It, however, involves the following problems.

In the prior transmission method, in order to do without sampling pulse, the adjacent figures of the encoding code always have different values (rule (2) above). That is, by the change of the value being sent in, it is known that the next figure is sent in. It is thus restricted that the adjacent figures must have different values. Accordingly, the encoding code becomes long, and increase of the transmission speed is limited.

It holds true in the last figure of certain data and the beginning figure of the next data. That is, the last figure of the encoding code and the beginning figure of the encoding code transmitted next must not be a same value. In order to maintain always this relation, it is limited that always different values must be given to the beginning figure and the ending figure of encoding code (see rule (3) above). It also causes to extend the encoding code, and impede the high speed tendency of the communication speed.

SUMMARY OF THE INVENTION

It is a primary object of the invention to solve the above problems and present a faster data transmitting method.

A method of communicating data between a sending device and a receiving device via a plurality of m parallel data lines which have K kinds of electric state in accordance with the present invention, said method comprises the steps of:

a) encoding each value of original data into a string of numeric code figure, wherein each figure has a value ranging from one to $K^m-1$;

b) changing an existing electric state of m parallel data lines on the basis of information of each figure in each string of numeric code figure;

c) acknowledging change in electric state of m parallel data line whereby restoring each figure in each string of numeric code figure;

d) restoring each value of the original data by means for decoding said restored numeric code figure string.

A data communicating system in accordance with the present invention comprises:

a) a sending device for sending data b) a receiving device for receiving data c) a communication path connected between said sending device and said receiving device, said communication path including m parallel data transmission line which has K kinds of electric state;

said sending device comprising a code table stored in first memory, encoding means for encoding each value of original data into a numeric code figure string on the basis of said code table and changing means for changing an existing electric state of said m parallel data line on the basis of information of each figure in each string of numeric code figure;

said receiving device comprising corresponding code table stored in second memory, means for acknowledging change in an electric state of said m parallel data line thereby restoring each figure in each string of numeric code figure and decoding means for decoding said restored numeric code figure string to recover the original data on the basis of said corresponding code table;

each figure in each said string of numeric code figure having a range from one to $K^m-1$.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a diagram showing an encoding table used in the data transmission method in FIG. 2.

FIG. 4 is a diagram showing an encoding table used in the data transmission method in FIG. 2.

FIG. 9 is an encoding table used in the above data transmission method.

FIG. 11 is a diagram showing the detail of the method of numerical values by changing the state of the transmission path.

FIG. 12 is a diagram showing a hardware configuration in other embodiment.

DETAILED DESCRIPTION OF THE EMBODIMENTS

Figure 7:
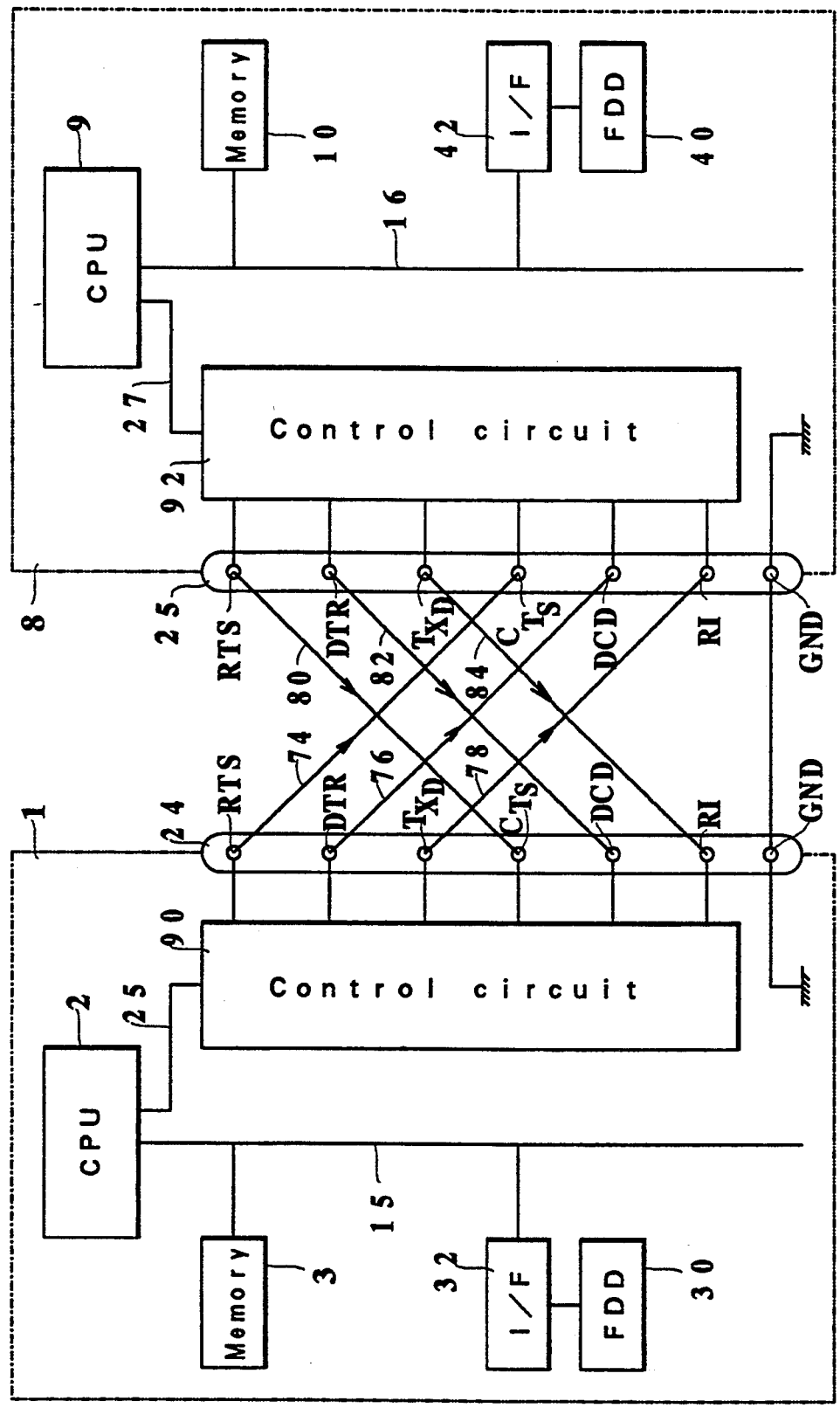
FIG. 7 is a diagram showing the hardware configuration used in the above data transmission method.

FIG. 7 shows a circuit diagram for realizing the data transmission method in an embodiment of the invention. A terminal 24 for RS-232C of a personal computer 1 and a terminal 25 for RS-232C of a personal computer 8 are connected by means of a cable as shown in the diagram. Terminals RTS, DTR and TXD and opposite terminals CTS, DCD and RI are connected. CPUs 2, 9 control the control circuits 90, 92 through control lines 25, 27 and data buses 15, 16, deliver data to the terminals RTS, DTR and TXD, and take in data from the terminals CTS, DCD and RI. The terminals RTS, DTR should be originally used in the modem interface, but are used as output terminals in this embodiment. Likewise, the terminals CTS, DCD are used as input terminals, instead of terminals for modem interface.

Figure 8:
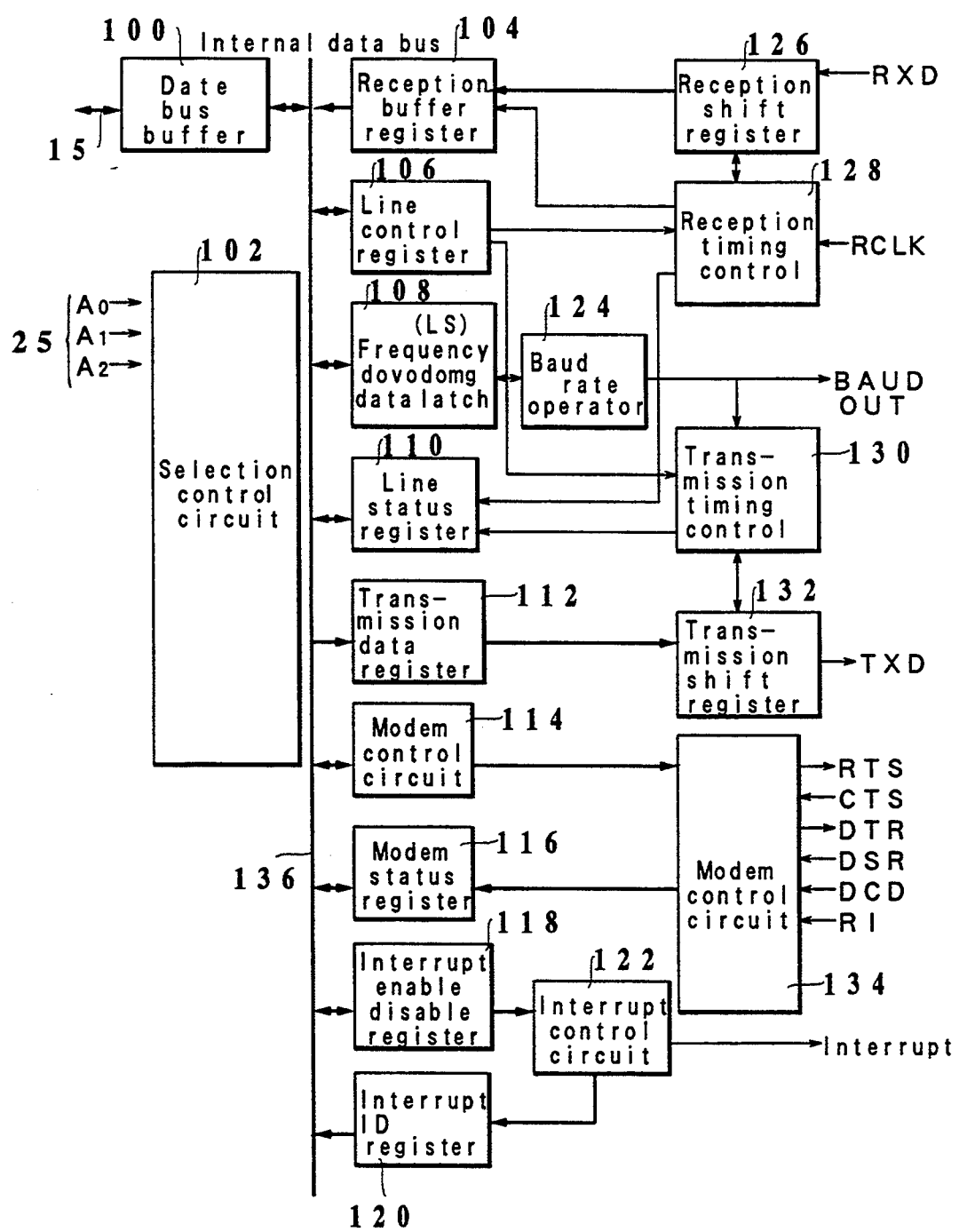
FIG. 8 is a block diagram showing the detail of a control circuit 90.

The detail of the control circuit 90 is shown in FIG. 8. A data bus buffer 100 is connected to an internal data bus 136 of the control circuit 90. The data bus buffer 100 is also connected to a data bus 15 of the CPU 2. The CPU 2 exchanges data through the data bus 15 and the data bus buffer 100.

The internal data bus 136 is connected with various registers 104, 106, 108, 110, 112, 114, 116, 118 and 120. When the CPU 2 exchanges data with any one of the registers, a selection signal is given to a selection control circuit 102 by the control line 25. Receiving the selection signal, the selection control circuit 102 enables to exchange data between the specified register and the internal data bus 136.

A modem control register 114 is to control outputs RTS, DTR of the modem control circuit 134. By setting the least significant bit of the modem control register 114 to H, the output RTS may be set to H. Likewise, by setting the second least significant bit to H, the output DTR may be set to H.

For example, when the CPU 2 is to set the terminal RTS to H level and the terminal DTR to L level, the operation is as follows. First, the CPU 2 selects the modem control register 114 by the control line 25. Next, through the data bus 15 and data bus buffer 100, (00000000001)2 is written in the modem control register 114. As a result, the terminal RTS becomes H level, and the terminal DTR, L level.

The terminal TXD is a signal sendout terminal for serial communication, and by nature it is not to be controlled directly from the CPU 2, 9. However, by sending a BREAK signal (the second most significant bit being H level) from the CPU 2 to the line control register 106, the terminal TXD may be set to H level. Thus, the CPU 2 controls the state of the terminals RTS, DTR, TXD.

Next is explained on the operation for reading the state of the terminals CTS, DCD, RI. For reading, a modem status register 116 is used. In the upper first bit of the modem status register 116, the state showing whether the terminal DCD is H or L is indicated. Similarly, in the second bit, the state of the terminal RI is shown, and in the fourth bit, the state of the terminal CTS is shown. The CPU 2 selects the modem status register 116 through the control line 25, and reads the content by way of the data bus buffer 100. Hence, the CPU 2 knows the state of the terminals CTS, DCD, RI.

The same is said of the control circuit 92.

In this embodiment, in this manner, using RS-232C terminals, communications are effected by making use of the RS-232C interface circuit. Therefore, in the appliance already equipped with RS-232C interface circuit, the invention may be executed only by modifying or adding the software without having to add the hardware.

When the transmission terminals can be controlled from the CPU and the state of the receiving terminals can be read by the CPU, this invention may be realized. For example, as shown in FIG. 12, buffers 50 to 72 may be provided for each terminal, and it may be designed to control directly from the CPU 2, 9.

The detail of data transmission will be described below. In the circuit shown in FIG. 7, it is supposed in the following explanation that the data is transmitted from the computer 1 side to the computer 8 side. In this embodiment, there are three communication lines 74, 76, 78 as data paths from the transmission side 1 to the reception side 8, and another three communication lines 80, 82, 84 as data paths are provided from the reception side 8 to the transmission side 1. In other embodiment, wireless path, such as radio transmission path, optical transmission path, may be used for communication path.

A floppy disk (not shown) storing the data to be transmitted is inserted into the disk drive 30. A receiving floppy disk (not shown) is inserted into the disk drive 40. The sending side CPU 2 reads out the data in the floppy disk through the interface 32. In this case, data in the unit of 8 bits (1 character) is transmitted.

In the memory 3 and memory 10, an encoding table as shown in FIG. 9 is stored. This table is to obtain an encoding code corresponding to each one of the values (there are 28) of 8-bit data (original data). For example, when the original data is $(00000000)_2$ (that is, 0 in decimal notation), the corresponding encoding code is 1. When the original data is $(00010011)_2$ (19 in decimal notation), the encoding code is 323.

The rule for preparing the encoding code is explained below. In the first place, the numerical value of each figure is any one from 1 to $2m-1$, (rule A), where m is the number of communication paths from the transmission side to the reception side. The reason of not containing 0, that is, 1 to $2m-1$ is given below. In this embodiment, meanwhile, since it is supposed that one communication path can take two states (H or L), the range is from 1 to $2m-1$, but when one communication path can take K states, the range is from 1 to $K^m-1$.

Secondly, no longer code string begins with figures corresponding to a valid short code string (rule B). Hence, the stop bit is not required.

Thirdly, values of original data which occur frequently is encoded into assigned short code strings (rule C).

Figure 6:
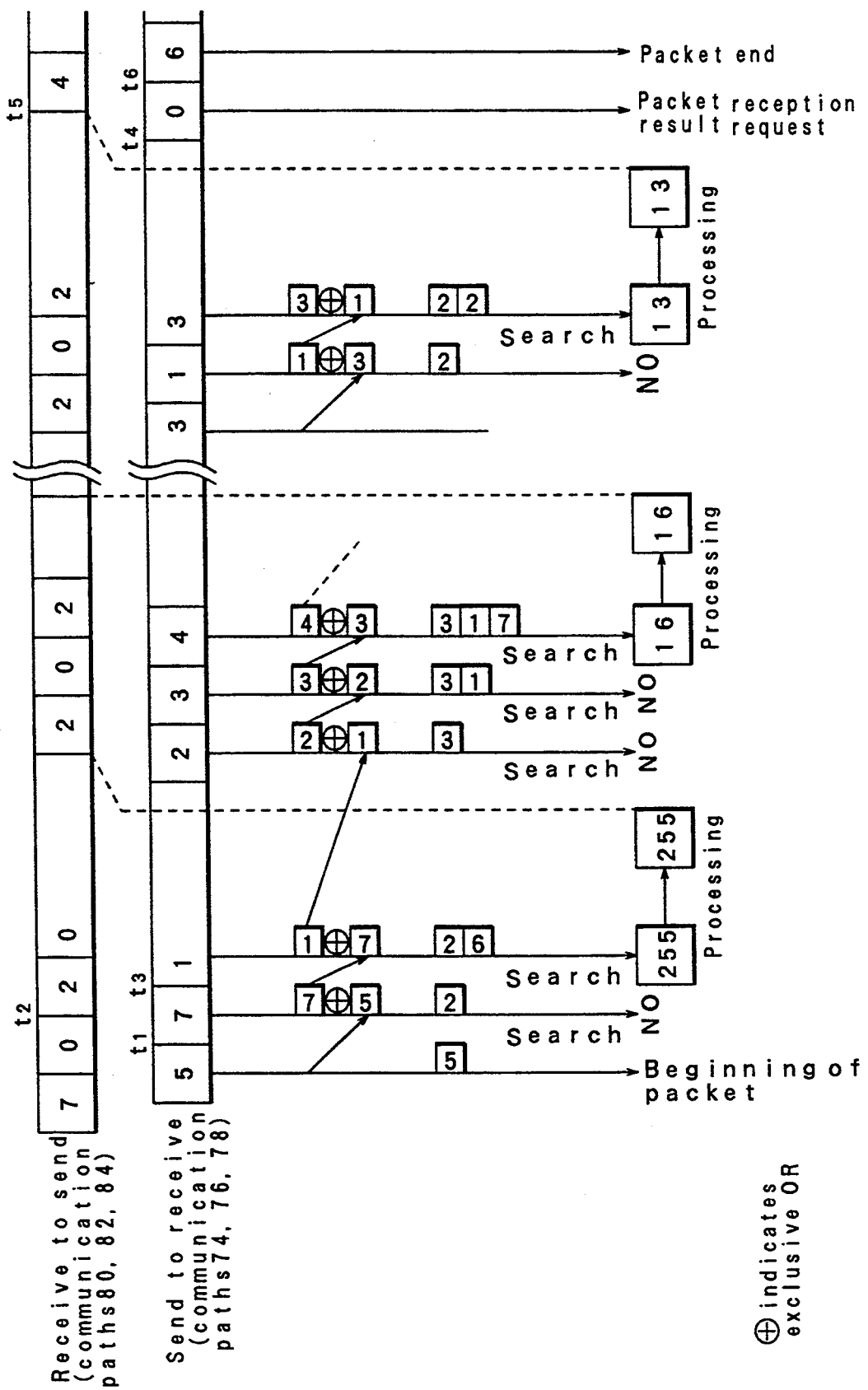
FIG. 6 is a diagram showing the data transmission method in an embodiment of the invention.
Figure 10:
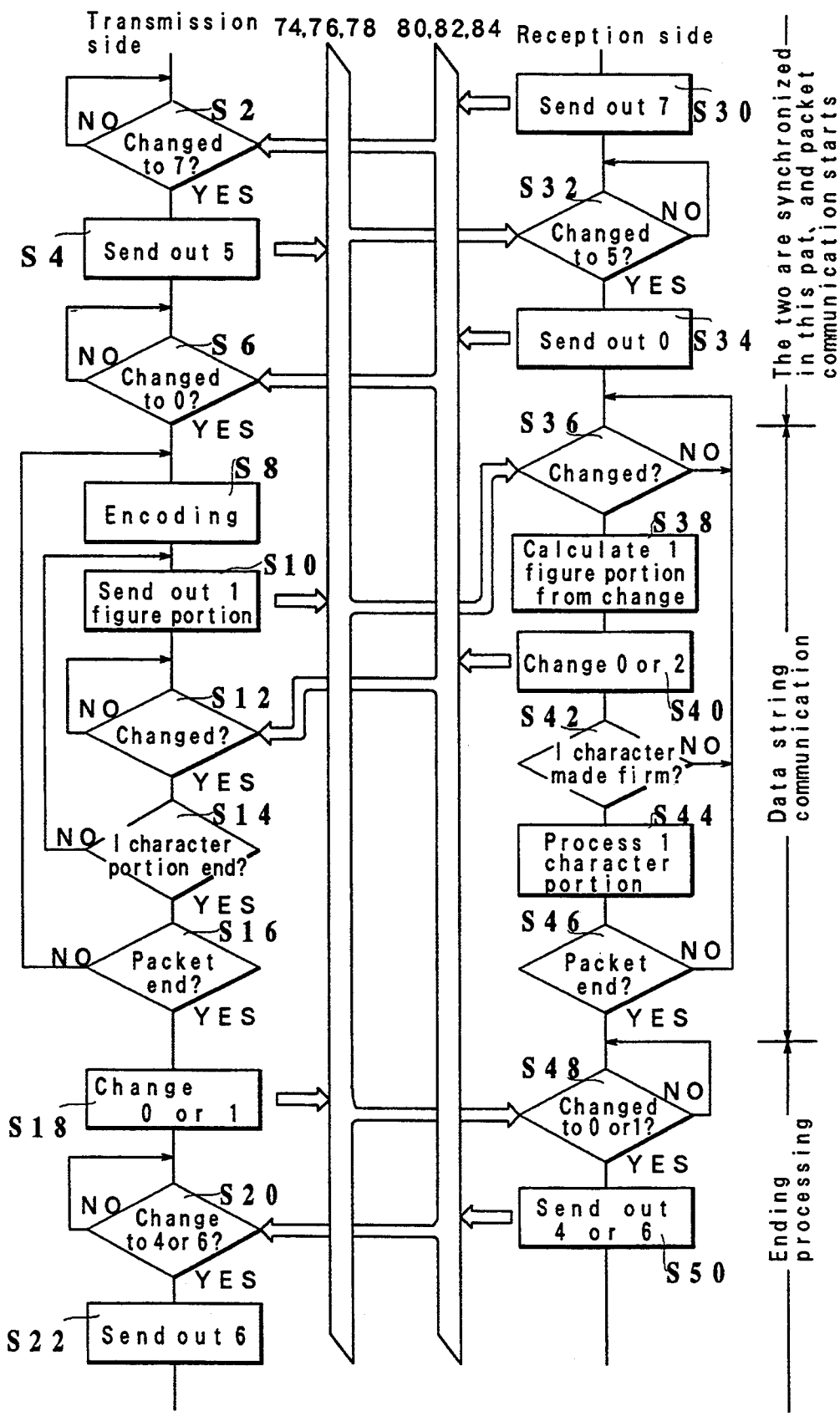
FIG. 10 is a flow chart of the above data transmission.

A flow chart of data transmission is shown in FIG. 10, and the data transmission state is given in FIG. 6. Referring now to these diagrams, the method of transmitting data will be described below. In this embodiment, a bunch of original data is transmitted as one packet.

At step $S_{30}$, the receiving CPU 9 sends out 7 through communication paths 80, 82, 84. In this embodiment, the communication path 80 (RTS) is used as the higher bit, the communication path 82 (DTR) as the middle bit, and the communication path 84 (TXD) as the lower bit. Therefore, when transmitting 7, all terminals RTS, DTR, TXD are set to H.

The sending CPU 2 receives 7 (step $S_2$), and sends back 5 (communication path 74 (RTS)=H, communication path 76 (DTR)=L, communication path 78 (TXD)=H) (step $S_4$). The receiving CPU 9, receiving this 5, recognizes that the transmission side is ready, and sends out 0 (step $S_{34}$). The sending CPU 2 receives 0, and recognizes that the reception side is ready (step $S_6$). Thus, the transmission side and reception side are synchronized, and it is ready to start communications.

The CPU 2 converts the original data to be transmitted to an encoding code (step $S_8$) according to the encoding table in FIG. 9. Supposing that the original data is $(11111111)_2$, or 255 in decimal notation, the encoding code is 26.

The CPU 2 does not transmit the first figure "2" of the encoding code obtained in this way directly as it is, but transmits by converting into the change of the state of transmission paths 74 (RTS), 76 (DTR), 78 (TXD). This mode is shown in FIG. 11. The present state of the communication paths 74 (RTS), 76 (DTR),78 (TXD) is 5 (101). The numerical value of the encoding code to be sent out is 2 (010). The present state of 5 (101) is changed by the portion corresponding to the numerical value 2 (010) to be transmitted (corresponding to communication path 76 (DTR)) (to 0 when 1, to 1 when 0). Mathematically, the exclusive OR of the two is calculated. Thus, the state of the communication paths 74 (RTS), 76 (DTR), 78 (TXD) is changed to 7 (111) (t1 in FIG. 6).

The receiving CPU 9, detecting this change in the communication paths, recognizes that the data is transmitted (step $S_{36}$). Thus, sampling pulse is not required. Therefore, the state of the communication paths 74, 76, 78 must be changed in every figure. Accordingly, the encoding code is composed of other numerical value than 0 (rule A). When the encoding code is 0, the state of the communication paths 74, 76, 78 is not changed. Anyway, when the value is in a range of 1 to 28-1 other than 0, however the numerical values may be combined, the state of the communication paths 74, 76, 78 is changed. Therefore, like in the prior art, it is not necessary to assign different values for the first figure and last figure, or for adjacent figures. That is, there is no limitation to encoding code, and the encoding code may be shortened.

The CPU 9, as the communication path changes from 5 to 7, performs an inverse operation of the transmission side, and obtains the numerical value of 2 (step $S_{38}$). When the numerical value 2 is obtained in this way, the CPU 9 consequently changes the state of the communication paths 80, 82, 84 from 0 to 2 (step $S_{40}$, t2 in FIG. 6).

Furthermore, the CPU 9 checks when the received data 2 is present in the encoding table or not (step $S_{42}$). Since there is no encoding code of 2, the operation returns to step $S_{36}$.

Figure 1:
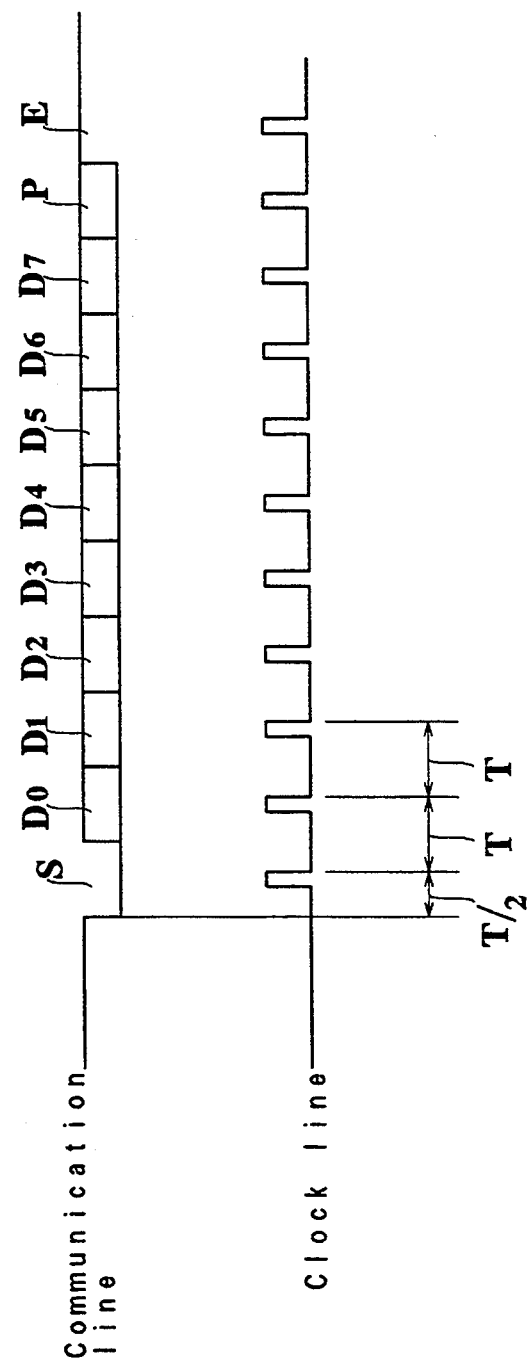
FIG. 1 is a drawing showing data transmission by conventional start-stop synchronous system.
Figure 2:
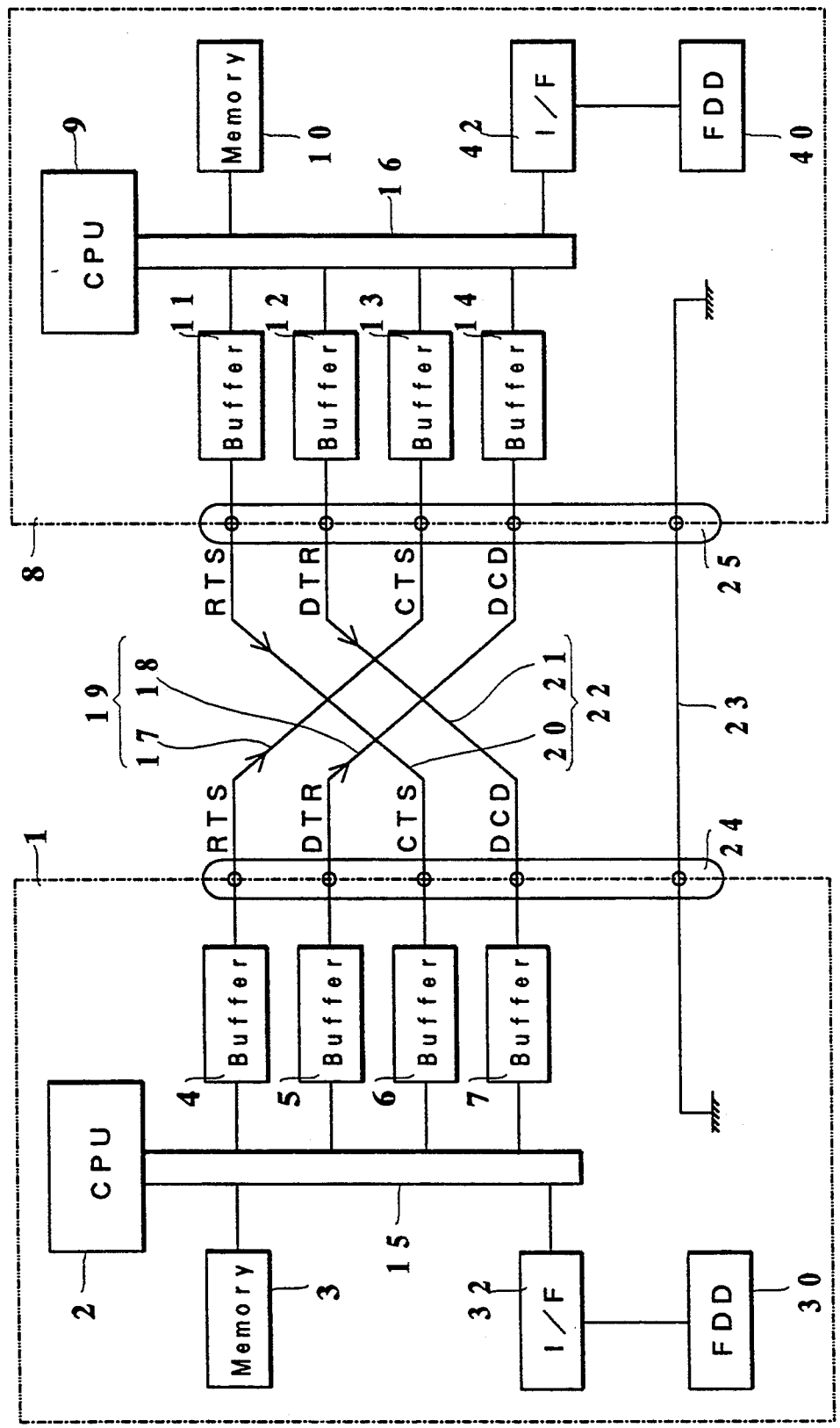
FIG. 2 is a diagram showing hardware configuration in the data transmission method disclosed in the Japanese Laid-open Patent Application HEI 2-262747.
Figure 5:
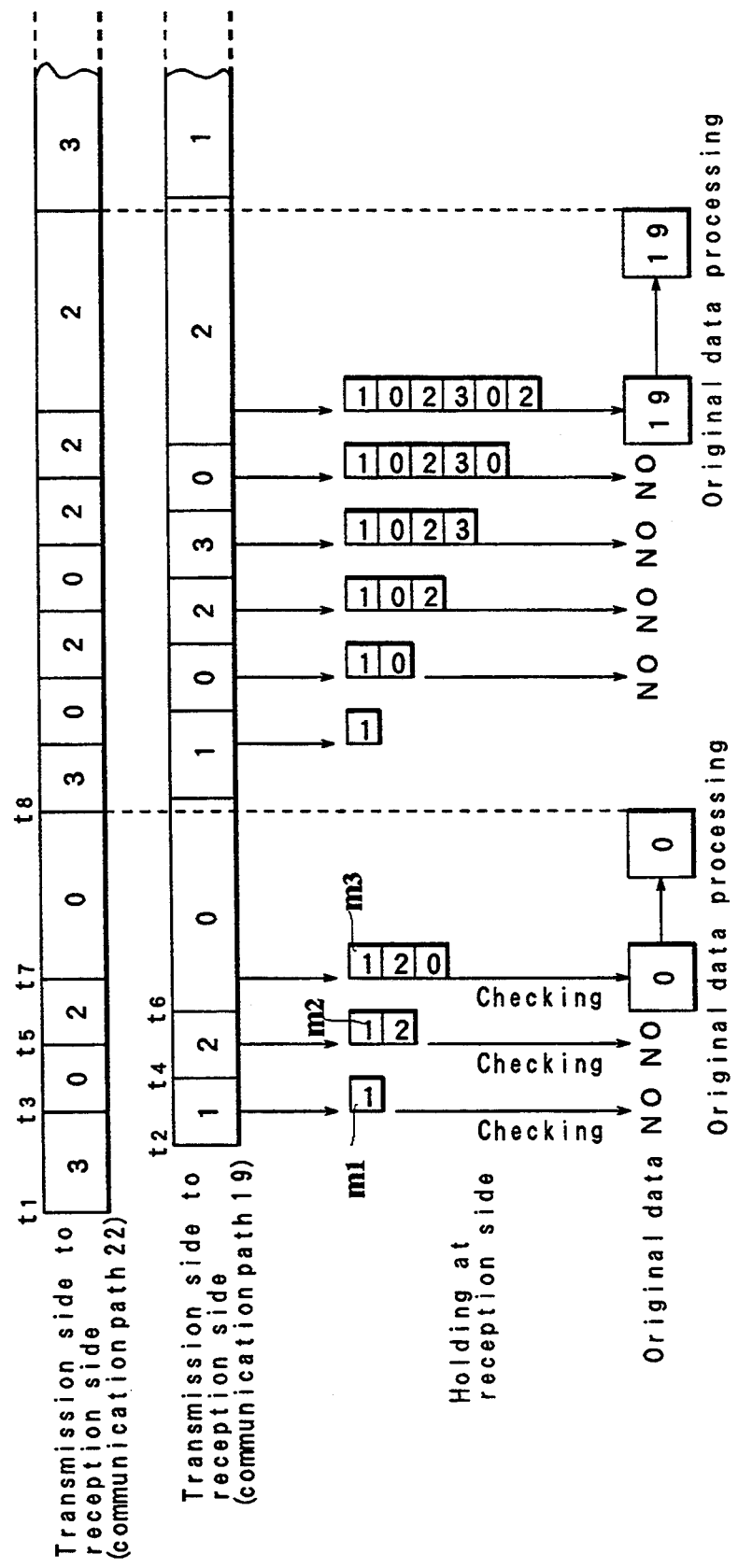
FIG. 5 is a diagram showing the detail of the data transmission method in FIG. 2.

On the other hand, the sending CPU 8, detecting that the communication paths 80, 82, 84 are changed from 0 to 2, recognizes that the reception side is ready to receive the next figure (step $S_{12}$, t2 in FIG. 6). At step $S_{14}$, it is judged when all figures (for the portion of 1 character) have been sent out or not. Now, only the first figure 2 of the encoding code 26 has been sent out, and the next figure 6 is left over, and the operation returns to step $S_{10}$. Then the next figure 6 is transmitted toward the reception side (step $S_{10}$). That is, as mentioned above, 1 is sent out as the exclusive OR of the present state 7 of the communication paths 74,76, 78 and the numerical value 6 desired to be sent out (see FIG. 11, step $S_{10}$ in FIG. 10, t3 in FIG. 6).

The receiving CPU 9, detecting that the value of the communication path 19 has been changed, recognizes that the numerical value of the next figure is transmitted (step $S_{36}$). As the state of the communication paths 74, 76,78, is changed from 7 to 1, the numerical value 6 is obtained (step $S_{38}$). The receiving CPU 9 obtains 26 by combining the previous figure 2 and the present figure 6. It is judged when this 26 is present or not in the encoding data (step $S_{42}$). The encoding code 26 corresponds to (11111111)2 of the original data or 255 of decimal notation, and is present in the encoding table (FIG. 9). Therefore, the receiving CPU 9 can restore the original data (11111111)2.

In encoding code of three figures or more, meanwhile, the encoding table is created so that nothing begins with 26 (rule B). Therefore, at this point, the original data (11111111)2 may be confirmed and restored. That is, stop bit is not needed. The CPU 9 writes the restored original data (11111111)2 into the floppy disk set in the drive 40 through the interface 42 (step $S_{44}$).

Then data transmission for one character is over in this way, the reception side returns to step $S_{36}$, and the transmission side returns to step $S_8$, thereby transmitting next original data.

When all data are completely transmitted, the sending CPU 2 sets the state of communication paths 74, 76, 78 to 0 or 1 (step $S_{18}$, t4 in FIG. 6). Receiving it, the receiving CPU 9 sends back 4 or 6 (step $S_{50}$, t5 in FIG. 6). In this embodiment, when received correctly, 4 is sent out, and when abnormal, 6 is sent out. Receiving it, the transmission side processes the error (for example, re-transmits) when abnormal. When there is no error, 6 is sent back, and the packet transmission is terminated (step $S_{22}$, t6 in FIG. 6). Thus, high speed data transmission is realized.

The operation is the same when the CPU 9 is the sending side and the CPU 2 is the receiving side.

When the size of the floppy disk of the sending computer 1 and the size of the floppy disk of the receiving computer 8 are different, data exchange by floppy disks is not possible. In such a case, by employing the above transmission method, high speed data transmission is enabled, which is particularly effective.

Of course in other cases than mentioned above, this is very effective as the method for transmitting data at high speed.

In the foregoing embodiments, meanwhile, three communication paths are used, but two or four or more paths may be used.

When the transmission side and reception side are fixed, the number of communication paths installed may be different from the transmission side to the reception side, and from the reception side to the transmission side.

In the embodiments, the communication paths 74,76, 78, 80, 82, 84 are explained as wired routes, but radio routes by light, infrared ray, radio wave, ultrasonic wave or the like may be also employed.

The embodiments relate to transmission by making use of communication paths conforming to the RS-232C standard (the method of use does not conform to the RS-232C standard), but it is also possible to abide by other standards.

In the data transmission method of the invention, it is intended to transmit the value of each figure of the encoding code by varying state of m communication paths. Therefore, by transmission of every figure, the state of the communication paths always changes, and it is not necessary to assign different numerical values for the adjacent figures of the encoding code. Furthermore, when sending the first figure of the next encoding code, the state of m communication paths always changes. Therefore, it is not necessary to assign different values for the first figure and last figure of the encoding code. In other words, the encoding code may be shortened without any restriction, transmission may be achieved at high speed.

It is meanwhile designed so that the values from the first figure to the P-th figure of the P-figure encoding code may not coincide with the values from the first figure to the P-th figure of the other encoding code in Q figures longer than the P-figure encoding code. Therefore, stop bit is not needed, and high speed transmission is realized.

Still more, the corresponding encoding code is set shorter for the original data higher in the incidence rate. Hence, faster data transmission is possible.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of communicating data between a sending device and a receiving device via a plurality of m parallel data paths which have K kinds of electric state, said method comprising the steps of:
    a) encoding each value of original data into a string of numeric code figure, wherein each figure has a value ranging from one to $K^m-1$;
    b) changing an existing electric state of m parallel data paths on the basis of information of each figure in each string of numeric code figure and said existing electric state of m parallel data paths;
    c) acknowledging change in electric state of m parallel data path whereby restoring each figure in each string of numeric code figure on the basis of said existing electric state and changed electric state;
    d) recovering each value of the original data by means for decoding said restored numeric code figure string.

2. A method in accordance with claim 1; wherein a value of K is 2.

3. A method in accordance with claim 2; wherein no longer code string begins with figures corresponding to a valid short code string.

4. A method in accordance with claim 2; wherein value of original data which occur frequently is encoded into short numeric code figure strings.

5. A method in accordance with claim 1; wherein said m parallel data paths are communication lines.

6. A method in accordance with claim 1; wherein said parallel data paths are wireless paths.

7. A data communicating system comprising:
    a) a sending device for sending data;
    b) a receiving device for receiving data; and
    c) a communication path connected between said sending device and said receiving device, said communication path including m parallel data transmission path which has K kinds of electric state;
    said sending device comprising a code table stored in a first memory, encoding means for encoding each value of original data into a numeric code figure string on the basis of said code table and changing means for changing an existing electric state of said m parallel data transmission path on the basis of information of each figure in each string of numeric code figure and said existing electrical state of said m parallel data transmission path;
    said receiving device comprising a corresponding code table stored in second memory, means for acknowledging change in an electric state of said m parallel data transmission path thereby restoring each figure in each string of numeric code figure on the basis of said existing electric state and changed electric state and decoding means for decoding said restored numeric code figure string to recover the original data on the basis of said corresponding code table; and
    each figure in each said string of numeric code figure having a range from one to $K^m-1$.

8. A data communication system in accordance with claim 7; wherein a value of K is 2.

9. A data communication system in accordance with claim 7; wherein no longer code string begins with figures corresponding to a valid short code string.

10. A data communication system in accordance with claim 7; wherein value of original data which occur frequently is encoded into short code figure strings.

11. A data communication system in accordance with claim 7; wherein said communication path is communication line.

12. A data communication system in accordance with claim 7; wherein said communication path is a wireless path.

* * * * *